US012725881B2

(12) United States Patent
Lux et al.

(10) Patent No.: US 12,725,881 B2
(45) Date of Patent: Sep. 1, 2026

(54) BATTERY CELL

(71) Applicant: Bayerische Motoren Werke Aktiengesellschaft, Munich (DE)

(72) Inventors: Simon Lux, Muenster (DE); Lydia Terborg, Muenster (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 599 days.

(21) Appl. No.: 18/021,879

(22) PCT Filed: Aug. 11, 2021

(86) PCT No.: PCT/EP2021/072337
§ 371 (c)(1),
(2) Date: Feb. 17, 2023

(87) PCT Pub. No.: WO2022/038009
PCT Pub. Date: Feb. 24, 2022

(65) Prior Publication Data

US 2023/0335858 A1 Oct. 19, 2023

(30) Foreign Application Priority Data

Aug. 21, 2020 (DE) ..................... 10 2020 121 945.8

(51) Int. Cl.
*H01M 50/00* (2021.01)
*H01M 50/15* (2021.01)
(Continued)

(52) U.S. Cl.
CPC ......... *H01M 50/394* (2021.01); *H01M 50/15* (2021.01); *H01M 50/3425* (2021.01);
(Continued)

(58) Field of Classification Search
CPC ............... H01M 50/30; H01M 50/342; H01M 50/3425; H01M 50/394; H01M 50/10;
(Continued)

(56) References Cited

U.S. PATENT DOCUMENTS

2012/0015218 A1* 1/2012 Lee ....................... H01M 50/30
429/53
2021/0119257 A1* 4/2021 Zhu ....................... H01M 4/525
(Continued)

FOREIGN PATENT DOCUMENTS

CN 204614843 U 9/2015
CN 109980173 A * 7/2019 ........ H01M 10/0525
(Continued)

OTHER PUBLICATIONS thefreedictionary.com, 2011 (Year: 2011).*
(Continued)

*Primary Examiner* — Tiffany Legette
*Assistant Examiner* — Douglas C Marroquin
(74) *Attorney, Agent, or Firm* — Crowell & Moring LLP

(57) ABSTRACT

Described is a battery cell (20) comprising at least one electrode unit (10), and a grating (13) having a plurality of grating webs (15) being arranged in the battery cell (20). The grating (13) is suitable to at least partly reduce the size of any particles produced when the electrode unit (10) is destroyed.

13 Claims, 2 Drawing Sheets

(51) Int. Cl.
*H01M 50/30* (2021.01)
*H01M 50/342* (2021.01)
*H01M 50/414* (2021.01)
*H01M 10/0525* (2010.01)

(52) U.S. Cl.
CPC ...... *H01M 50/414* (2021.01); *H01M 10/0525* (2013.01); *H01M 2220/20* (2013.01)

(58) Field of Classification Search
CPC .. H01M 50/40; H01M 50/15; H01M 2200/20; H01M 10/0525
See application file for complete search history.

(56) References Cited

U.S. PATENT DOCUMENTS

2021/0313650 A1* 10/2021 Gondoh ................ H01M 50/35
2021/0359372 A1* 11/2021 Wu ..................... H01M 50/148

FOREIGN PATENT DOCUMENTS

| | | | | |
|---|---|---|---|---|
| CN | 209896110 U | | 1/2020 | |
| CN | 110957438 A | * | 4/2020 | ............ H01M 50/15 |
| DE | 10 2013 203 108 A1 | | 8/2014 | |
| DE | 10 2013 204 585 A1 | | 9/2014 | |
| DE | 102015014343 A1 | * | 7/2016 | .......... H01M 50/211 |
| DE | 10 2015 005 592 A1 | | 11/2016 | |
| EP | 2 410 592 A1 | | 1/2012 | |
| JP | 2000-182591 A | | 6/2000 | |
| JP | 2012155897 A | * | 8/2012 | ............ H01M 50/10 |
| WO | WO 2020/039722 A1 | | 2/2020 | |

OTHER PUBLICATIONS thefreedictionary.com (Year: 2011).*

International Search Report (PCT/ISA/210) issued in PCT Application No. PCT/EP2021/072337 dated Nov. 30, 2021 with English translation (five (5) pages).

German-language Written Opinion (PCT/ISA/237) issued in PCT Application No. PCT/EP2021/072337 dated Nov. 30, 2021 (six (6) pages).

German-language Search Report issued in German Application No. 10 2020 121 945.8 dated Apr. 19, 2021 with partial English translation (11 pages).

English translation of Chinese-language Office Action issued in Chinese Application No. 202180057272.3 dated Dec. 4, 2025 (8 pages).

* cited by examiner

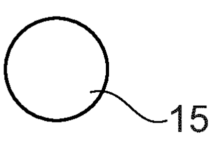
Fig. 3A
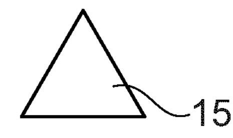
Fig. 3B
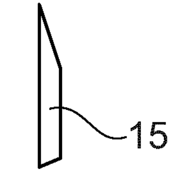
Fig. 3C
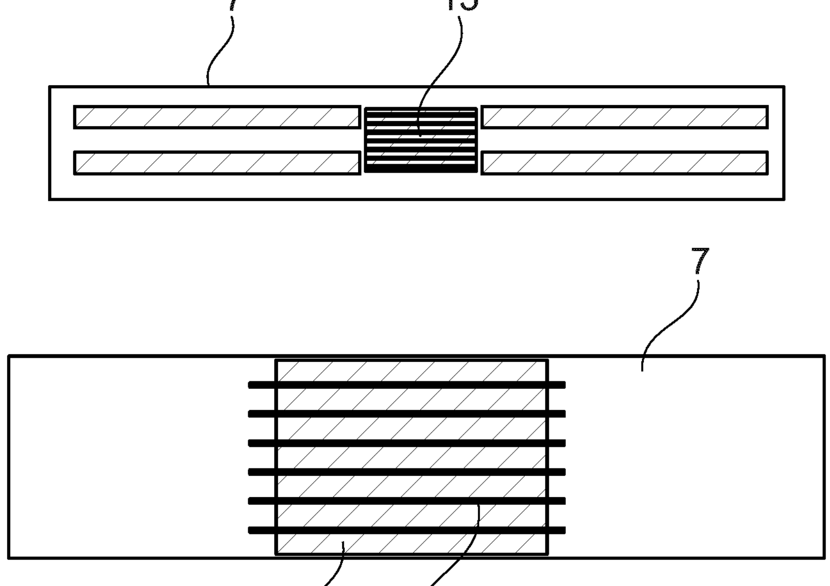
16 15
Fig. 4
12
13
Fig. 5

BATTERY CELL

BACKGROUND AND SUMMARY

The invention relates to a battery cell, in particular, to a prismatic battery cell for a high voltage battery.

In electrically driven motor vehicles, such as electric vehicles, hybrid or plug-in hybrid vehicles, high voltage batteries are used which, typically, have one or more battery modules each having a plurality of battery cells. Because of the achievable high energy density, lithium-ion batteries in particular are used in motor vehicles. Here and in the following text, the term "lithium-ion battery" will be used synonymously for all the designations that are usual in the prior art for galvanic elements and cells containing lithium, such as, for example, lithium battery, lithium cell, lithium-ion cell, lithium polymer cell and lithium-ion accumulator. In particular, rechargeable batteries (secondary batteries) are included. The lithium-ion battery can also be a solid-state battery, for example, a ceramic or polymer-based solid-state battery.

In the event of a mechanical impact on the battery cell which, for example, effects a deformation, and/or the penetration of a sharp object into the battery cell, or in the event of overcharging the battery cell, there may be the risk of overheating in the battery cell. As a result of exothermic electrode reactions, for example, because of a short circuit of the electrodes, it is possible for thermal runaway of the battery cell to occur. At high temperatures, it is in particular possible for evaporation of the electrolyte contained in the battery cell to occur, as a result of which a critical overpressure may be produced in the battery cell. In a battery module having a plurality of battery cells, the thermal runaway of one battery cell can lead to a propagation of the overheating to the adjacent battery cells, so that there can be a risk of damage to the entire battery module or even the entire high voltage battery if this is not prevented by suitable safety measures.

In the document DE 10 2015 014 343 A1, a cell holder for a battery cell is described which, on a housing surface, has an opening with a bursting membrane for dissipating overpressure. Such a bursting membrane is provided to dissipate the gas arising as a result of evaporation of the electrolyte and, in this way, to reduce the positive pressure in the battery cell.

In the event of a thermal runaway of a battery cell, high levels of energy can be liberated within seconds; in particular, the electrolyte can evaporate and the active materials can break down. As a result, a positive pressure is produced in a built-up manner which indeed can be reduced by opening a bursting membrane. When the bursting membrane is opened, there is a risk that parts or particles from the electrode stack are ejected from the battery cell as a result of the rapid progress of the reaction. If relatively large parts or particles are ejected from the battery cell, there is a risk that these parts or particles may damage adjacent battery cells which, for example, are installed jointly in a battery module. Relatively large particles ejected from the battery cell can cause a short circuit in adjacent battery cells. In particular, these particles can trigger short circuits in serial and parallel connections of adjacent cells in a traction battery.

It is an object of the disclosure to specify an improved battery cell in which the risk that large particles are ejected from the battery cell is reduced.

This object may be achieved by a battery cell according to the independent claim. Advantageous embodiments and developments of the invention are gathered from the dependent claims.

According to one embodiment, a grating which has a large number of grating webs is arranged in the battery cell. The grating webs are, for example, arranged parallel to one another. The grating is suitable to at least partially reduce the size of particles which form in the event of a destruction of an electrode unit contained in the battery cell. In particular, as they flow through the grating, the particles from the destroyed electrode unit may strike the grating webs and, as a result, may be divided into two or more fragments.

The electrode unit is, for example, an electrode stack or an electrode coil. The electrode stack or electrode coil in particular contains a layer sequence of anode and cathode layers, which are each separated from one another by a separator. The battery cell can in particular be a lithium-ion battery cell.

The battery cell is preferably a prismatic battery cell, which has a solid battery cell housing in which the electrode unit is arranged. The battery cell housing can, for example, have a rectangular outline and be substantially cuboidal. Prismatic battery cells can advantageously be stacked easily and assembled to form a battery module. The battery cell housing can, for example, have a housing main body, which has a bottom wall and side walls, and a cover.

The technology is based in particular on the following considerations: if, for example, a thermal runaway of the battery cell occurs, there is the risk that the electrode unit contained in the battery cell may be destroyed wholly or partly and, as a result of a positive pressure in the battery cell, particles from the destroyed electrode unit may be ejected from the battery cell housing. For example, it is possible that about 30% to 70%, in particular about 40% to 60%, of the material of the electrode unit may be ejected from the battery cell. The particles can be, for example, constituent parts of the electrodes, that is, particles of the anode material and/or the cathode material. Ejection of the particles is in itself a not undesired effect since, as a result, the temperature in the battery cell may be reduced and thus a risk of a propagation of the thermal runaway to adjacent battery cells may be reduced. However, there is a risk that the particles ejected, if they are large particles, may produce a short circuit in adjacent cells and/or an arc in the traction battery. The grating has a safety function in the battery cell. The grating webs of the grating, in the battery cell according to this disclosure, can reduce the size of such particles as they flow through the grating. As they flow through the grating, the particles may strike the grating webs and may thus, for example, be fragmented into a plurality of smaller particles. In this way, the risk that particles ejected from the battery cell will damage or short-circuit adjacent battery cells is reduced.

The grating webs can be implemented, for example, as thin wires. In this case, it is possible that the grating webs may have a circular cross section. Alternatively, however, other cross-sectional shapes of the grating webs are also possible. The grating webs preferably include a metal or a metal alloy, for example aluminum, nickel or stainless steel. Preferred materials of the grating webs are nickel or stainless steel because of the high temperature stability.

In a preferred configuration, the grating webs have a tip on at least one side of their cross-sectional area. Here, the cross-sectional area is to be understood as the cross-sectional area which the grating webs have in section perpendicular to the longitudinal extent thereof. The cross-sectional shape of the grating webs is preferably a polygon which, on at least one side, has a sharp angle, such as, for example, an acute triangle. In particular, provision can be made for the grating webs to have a knife edge along their longitudinal direction. For example, the grating webs can have the shape of blades. The tips of the grating webs, for example the tips of the knife edges, are in this case advantageously aligned in such a way that they are directed counter to the gas stream to be expected in the battery cell. If the battery cell has an emergency vent opening such as, for example, a bursting membrane, which opens in the event of a critical state of the battery cell, the gas stream takes place in the direction of the emergency vent opening. The tip of the cross-sectional area of the grating webs is in this case directed counter to the gas stream to the emergency vent opening, i.e., the tips point away from the emergency vent opening. In this advantageous refinement, the particles strike the tips of the grating webs when the emergency vent opening is opened. This increases the probability that the particles will be fragmented by the grating webs.

According to one embodiment, the grating webs have a transverse extent of 100 μm inclusive up to 2 mm inclusive. The spacing of the grating webs is preferably from 100 μm inclusive up to 4 mm inclusive, particularly preferably from 200 μm inclusive up to 500 μm inclusive. The number of grating webs is preferably from 4 inclusive to 24 inclusive.

In one configuration, the battery cell has a cover, on which an emergency vent opening is arranged. The battery cell can, for example, have a first and a second terminal on the cover, wherein the emergency vent opening is arranged between the terminals.

The grating is preferably arranged between the electrode unit and the emergency vent opening. When the grating is arranged between the electrode unit and the emergency vent opening, particles which can be produced during destruction of the electrode unit may strike the grating in the gas stream toward the emergency vent opening and be fragmented there.

According to one embodiment, the grating is arranged in a holder, which is located between the cover and the electrode unit. The holder may be provided in particular to fix the electrode unit in the battery cell housing. In one embodiment, this holder is used simultaneously as a holder for the grating. For example, the holder can have an opening in a region which is located under an emergency vent opening arranged in the cover of the battery cell housing. The grating can be arranged in this opening. For example, the ends of the grating webs may be fixed in the holder and the grating may span the opening. The holder can be a polymeric part, wherein the ends of the grating webs are fixed in the polymer. In this configuration, the grating webs can be arranged in a film which is arranged in the opening of the holder. The film can, for example, include polypropylene (PP), polyethylene terephthalate (PET) or polyimide (PI).

In a further embodiment, the grating is arranged between the holder, which is located between the cover and the electrode unit, and the cover. In this embodiment, too, the grating webs are preferably arranged in a film which, for example, includes polypropylene (PP), polyethylene terephthalate (PET) or polyimide (PI). The grating webs can in particular be fixed integrally in the film. The film can be, for example, fixed, e.g., clamped, between the cover and the holder. It may be advantageous if the ends of the grating webs are fixed to the cover. In this embodiment, it may additionally be advantageous if the film includes a first polymer in an outer region and includes a second polymer in an inner region, where the first polymer has a greater hardness than the second polymer. The softer polymer may be, for example, polypropylene (PP) or polyethylene terephthalate (PET). The harder polymer may be, for example, Kapton or Mylar. The gas stream can tear the softer polymer out of the film, but the grating webs may remain fixed by the harder polymer in the outer region.

According to a further embodiment, the grating is arranged in a film on the electrode unit. The film can enclose the electrode unit and be provided for electrical insulation of the electrode unit from the battery cell housing. In the embodiment described here, the grating may be integrated in this film. Advantageously, the grating webs are integrated or embedded in a polymer material of the film in such a way that they are enclosed completely by the polymer material and the electrically insulating action of the film is maintained. As in the previously described embodiments, the film can, for example, include polypropylene (PP), polyethylene terephthalate (PET) or polyimide (PI).

Also proposed are a lithium-ion battery having a plurality of the battery cells described herein and also a motor vehicle having such a lithium-ion battery. Because of the improved safety, the battery cell described herein can advantageously be used in a lithium-ion battery, which in particular can be used as a traction battery in an electrically driven motor vehicle.

Exemplary embodiments are described below by reference to the figures. These reveal further details, preferred embodiments and developments of the technology.

BRIEF DESCRIPTION OF THE DRAWINGS

In detail, schematically,

FIGS. 3A to 3C show a cross section through a grating web in various exemplary embodiments, FIG. 4 shows a plan view of the inside of the holder in a further exemplary embodiment, and FIG. 5 shows a plan view of a film applied to the electrode unit in a further exemplary embodiment.

In the figures, the components that are the same or have the same action are each provided with the same designations. The constituent parts illustrated and the size relationships of the constituent parts relative to one another are not to be viewed as true to scale.

DETAILED DESCRIPTION OF THE DRAWINGS

Figure 1:
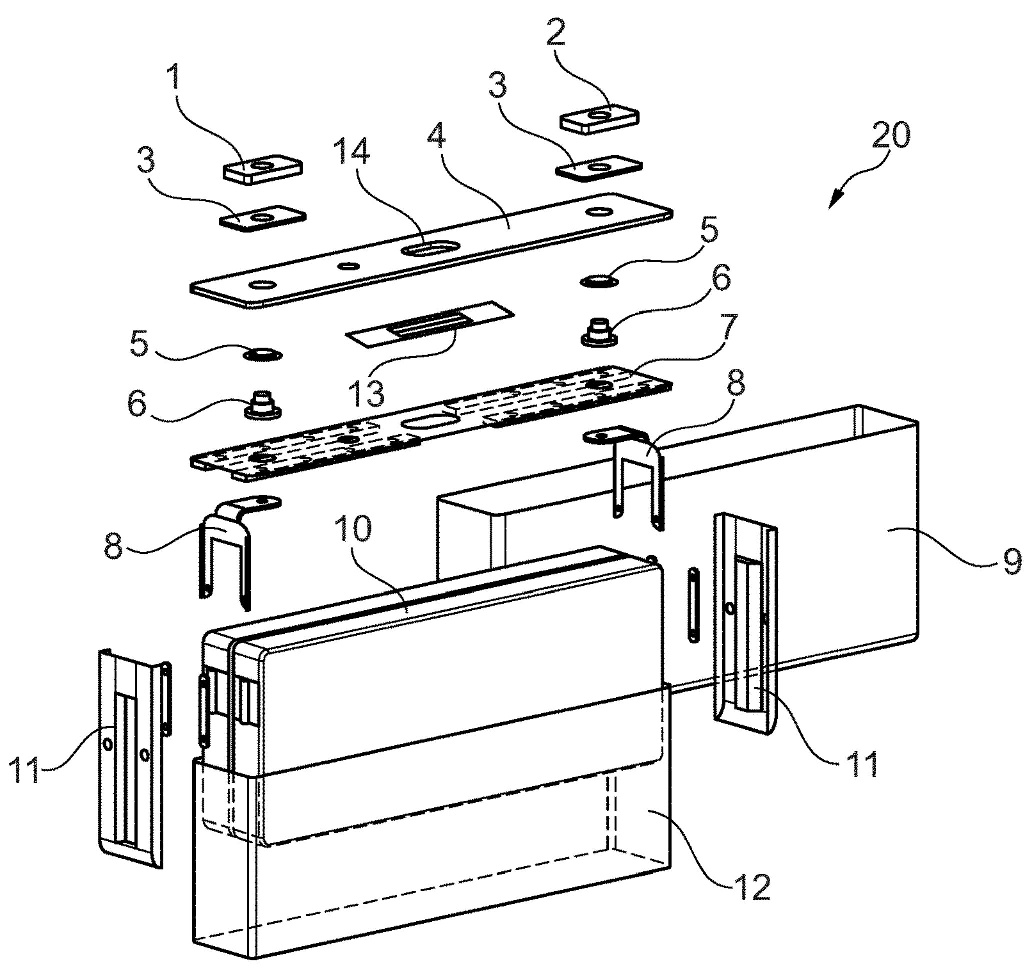
FIG. 1 shows an exploded illustration of a battery cell according to one exemplary embodiment.

The battery cell 20 illustrated schematically in an exploded illustration in FIG. 1 is a prismatic battery cell 20. The battery cell 20 has a battery cell housing, which is formed by a housing main body 9 and a cover 4. The battery cell housing forms a mechanically solid jacket for the electrode unit 10 arranged therein. The electrode layers can be present in the electrode unit 10 as a stack or coil (jelly roll), for example. The battery cell housing in the exemplary embodiment has a rectangular outline and is substantially cuboidal. The housing main body 9 and the cover 4 of the battery cell housing can be formed from a metal such as, for example, aluminum. It is possible that the battery cell housing has an electrically insulating coating, at least in some regions.

The battery cell 20 has a first terminal 1 and a second terminal 2, wherein the terminals 1, 2 are arranged on the cover 4 of the battery cell housing. The terminals 1, 2 are provided to make electrical contact with the poles of the battery cell 20 and can each be electrically insulated from the cover 4 by an insulating plate 3. The terminals 1, 2 in the example shown are each connected to a current collector 8 of the electrode unit 10 by a rivet 6, which is led through the cover 4. To seal off the passages through the cover 4, seals 5 are provided. The electrode unit 10 is fixed by a holder 7, which is arranged between the electrode unit 10 and the cover 4, and lateral holders 11 in the battery cell housing. The electrode unit 10 can be provided with a film 12.

An emergency vent opening 14 is arranged in the cover 4 of the battery cell housing. The emergency vent opening 14 is closed, for example by a bursting membrane, during normal operation of the battery cell 20. If the internal pressure in the battery cell 20 rises above a critical limit (typically between 6 bar and 15 bar), the bursting membrane opens, so that the pressure can escape. The bursting membrane (not illustrated) can, for example, be fixed in the emergency vent opening by laser welding. The bursting membrane can, for example, have a thickness from 80 μm to 400 μm, preferably from 100 μm to 300 μm.

FIG. 1 additionally shows a grating 13, which is arranged between the upper cell holder 7 and the emergency vent opening 14. The grating 13 has the function of reducing the size of particles that are produced in the event of destruction of the electrode unit 10. The particles can, for example, be ejected from the battery cell 20 by a gas stream after a bursting membrane in the emergency vent opening 14 has opened. Here, the particles strike the grating 13, which is provided to reduce the size of the particles. In this way, the risk that particles ejected from the battery cell 20 will cause a short circuit of adjacent battery cells is reduced.

Figure 2:
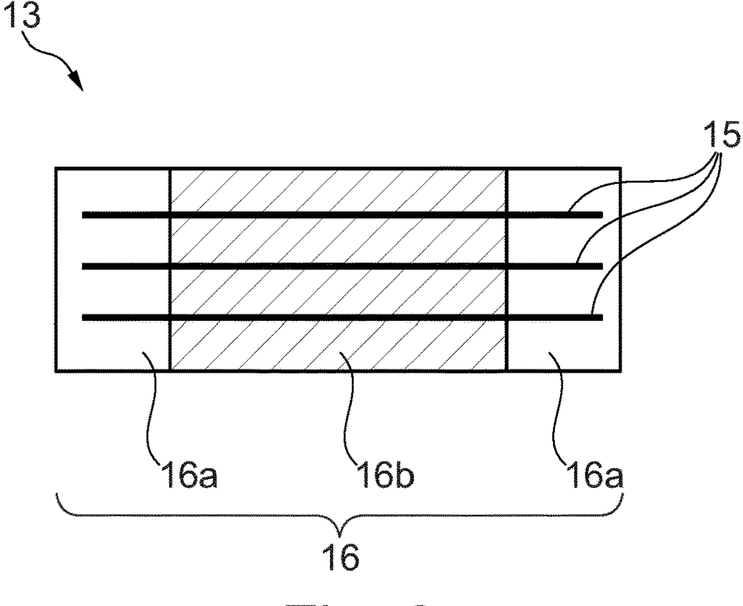
FIG. 2 shows a plan view of the grating in the exemplary embodiment.

A detailed view of the grating 13 according to one exemplary embodiment is shown in FIG. 2. The grating 13 has a plurality of grating webs 15. Particles which strike the grating 13 can be reduced in size by the impact on the grating webs 15. For example, the particles may be broken down into two or more segments. The grating webs 15 are embedded in a film 16 in the example shown here. The film 16 is advantageously made in two parts and has an outer part 16*a* made of a harder material and an inner part 16*b* made of a softer material. For example, the outer part 16*a* has a harder polymer such as, for example, Kapton or Mylar, and the inner part 16*b* has a softer polymer such as, for example, PP, PET or PI. The inner part 16*b* made of the softer polymer can be detached from the film 16 by the gas stream in the event of a high pressure, so that the grating webs 15 are exposed.

FIGS. 3A to 3C show, schematically, several examples of possible cross-sectional shapes of the grating webs 15. The grating webs 15 can be formed to be circular, as in FIG. 3A, in particular as thin wires. Alternatively, however, any other desired cross-sectional shapes are also possible, for example triangles as in FIG. 3B or other polygons. It is advantageous if the cross-sectional area of the grating webs has an acute angle. The acute angle advantageously faces the particle stream to be expected. In particular, the grating webs 15 can be configured as blades, as illustrated by way of example in FIG. 3C. The tip of the blade-like grating webs 15 in this case preferably points in the direction of the particle stream from the electrode unit 10 to the emergency vent opening 14.

FIG. 4 shows the arrangement of the grating 13 in a further exemplary embodiment, in which the grating 13 is located in a recess in the holder 7. In FIG. 4 a top view of the holder 7 and a detailed enlargement of the region of the grating 13 are illustrated. In this example, the grating 13 is not inserted into the battery cell 20 as a separate component but integrated into the holder 7. The grating webs 15 are integrated into a film 16, which is arranged in a recess in the upper holder 7. The film 16 includes, for example, PP, PET or PI. The grating webs 15 can be implemented as thin wires. Here, any desired cross-sectional shapes are possible, as explained in connection with FIGS. 3A to 3C. Preferably, the ends of the grating webs 15 are fixed in the holder 7. In this case, the film 16 can be torn out by an overpressure, so that only the grating webs 15 remain in the opening in the upper cell holder.

FIG. 5 shows the arrangement of the grating 13 in a further exemplary embodiment, in which the grating 13 is integrated in a film 12 (cf. FIG. 1), which is arranged on the electrode unit 10. As an alternative to what is shown in the schematic exploded illustration of FIG. 1, the film 12 can cover the surface of the electrode unit 10 substantially completely, in particular, the entire surface of the electrode unit 10, with the exception of the regions which are provided for making electrical contact. The film 12 can include PP, PET or PI, as in the previously described examples.

Although the invention has been illustrated and described in detail with reference to exemplary embodiments, the invention is not restricted by the exemplary embodiments. Instead, other variations of the invention can be derived therefrom by those skilled in the art without departing from the scope of protection of the invention defined by the claims.

LIST OF DESIGNATIONS

1 First terminal
2 Second terminal
3 Insulating plate
4 Cover
5 Seal
6 Rivet
7 Holder
8 Current collector
9 Housing main body
10 Electrode unit
11 Lateral holder
12 Film on electrode unit
13 Grating
14 Emergency vent opening
15 Grating web
16 Film
16*a* Outer region
16*b* Inner region
20 Battery cell

The invention claimed is:

1. A battery cell comprising:

a battery cell housing including a cover;

an electrode unit arranged in the battery cell housing;

an emergency vent opening including a bursting membrane arranged in the cover, the bursting membrane closing the emergency vent opening during normal operation of the battery cell; and a grating having a plurality of grating webs arranged in the battery cell, the grating being positioned between the bursting membrane and the electrode unit, wherein the grating is configured to at least partly reduce a size of particles produced in an event of destruction of the electrode unit, the grating webs being configured to have triangular or polygonal cross-sectional shapes comprising at least one acute angle, each acute angle being defined by two adjoining walls of the cross-sectional shape, and/or wherein the grating webs are configured as blades each having at least one tip, and wherein the at least one acute angle and/or the at least one tip point in a direction of the electrode unit so as to be facing a particle stream expected in an event of destruction of the electrode unit.

2. The battery cell according to claim 1, wherein the grating webs are arranged parallel to one another.

3. The battery cell according to claim 1, wherein the grating webs have a transverse extent from 100 μm up to 2 mm.

4. The battery cell according to claim 1, wherein the grating webs have a spacing from 100 μm up to 4 mm.

5. The battery cell according to claim 1, wherein a number of grating webs is from 4 up to 24.

6. The battery cell according to claim 1, wherein the bursting membrane has a thickness from 80 μm to 400 μm.

7. The battery cell according to claim 1, further comprising:

a holder located between the cover and the electrode unit, wherein the grating is arranged in the holder.

8. The battery cell according to claim 1, further comprising:

a holder located between the cover and the electrode unit, wherein the grating is arranged between the holder and the cover.

9. The battery cell according to claim 1, further comprising:

a film on the electrode unit, wherein the grating is integrated in the film.

10. The battery cell according to claim 1, wherein the grating webs are embedded in a film.

11. The battery cell according to claim 10, wherein the film has a first polymer in an outer region and has a second polymer in an inner region, and wherein the first polymer has a greater hardness than the second polymer.

12. A lithium-ion battery comprising:

a plurality of the battery cells according to claim 1.

13. A motor vehicle comprising:

a lithium-ion battery according to claim 12.

* * * * *